United States Patent
Thomas et al.

(10) Patent No.: US 10,063,675 B2
(45) Date of Patent: Aug. 28, 2018

(54) PERFORMING DUPLICATE ADDRESS DETECTION FOR AN INTEGRATED ROUTING AND BRIDGING DEVICE

(71) Applicant: Juniper Networks, Inc., Sunnyvale, CA (US)

(72) Inventors: Reji Thomas, Bangalore (IN); Jithin Girish, Bangalore (IN); Pranavadatta D N, Mysore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 193 days.

(21) Appl. No.: 15/083,800

(22) Filed: Mar. 29, 2016

(65) Prior Publication Data

US 2017/0289094 A1  Oct. 5, 2017

(51) Int. Cl.
*H04L 29/08* (2006.01)
*H04L 12/823* (2013.01)
*H04L 29/12* (2006.01)
*H04L 12/741* (2013.01)

(52) U.S. Cl.
CPC ............ *H04L 69/325* (2013.01); *H04L 45/74* (2013.01); *H04L 47/32* (2013.01); *H04L 61/2007* (2013.01); *H04L 61/2092* (2013.01); *H04L 69/324* (2013.01); *H04L 61/6004* (2013.01); *H04L 61/6022* (2013.01); *H04L 61/6077* (2013.01)

(58) Field of Classification Search
None
See application file for complete search history.

(56) References Cited

U.S. PATENT DOCUMENTS

| | | | | |
|---|---|---|---|---|
| 6,167,052 A | * | 12/2000 | McNeill | H04L 12/1886 370/399 |
| 9,762,669 B2 | * | 9/2017 | Dain | H04L 67/1097 |
| 2002/0112076 A1 | * | 8/2002 | Rueda | H04L 12/14 709/245 |
| 2003/0236897 A1 | * | 12/2003 | Shitano | H04L 29/1232 709/229 |

(Continued)

OTHER PUBLICATIONS

S. Thomson et al. "RFC 2462." Dec. 1998, <https://tools.ietf.org/html/rfc2462>.*
Juniper Networks, "Understanding Routed VLAN Interfaces on EX Series Switches," https://www.juniper.net/techpubs/en_US/junos12.1/topics/concept/bridging-routed-vlan-interface.html, Aug. 16, 2011, 4 pages.
Wikipedia, "IPv6 address," https://en.wikipedia.org/wiki/IPv6_address, Mar. 15, 2016, 15 pages.

(Continued)

*Primary Examiner* — Andrew Oh
(74) *Attorney, Agent, or Firm* — Harrity & Harrity, LLP

(57) ABSTRACT

A device may activate a layer 3 interface of the device based on activation of a first layer 2 interface associated with the layer 3 interface. The device may detect activation of a second layer 2 interface, associated with the layer 3 interface, after activating the layer 3 interface. The device may activate a filter to prevent transfer of network traffic via the second layer 2 interface based on detecting activation of the second layer 2 interface. The device may perform duplicate address detection, in association with the second layer 2 interface, for a layer 3 network address assigned to the device. The device may determine whether the layer 3 network address is a duplicate network address based on performing the duplicate address detection. The device may selectively maintain or deactivate the filter based on determining whether the layer 3 network address is a duplicate network address.

20 Claims, 6 Drawing Sheets

(56) References Cited

U.S. PATENT DOCUMENTS

| | | | | |
|---|---|---|---|---|
| 2004/0258007 A1* | 12/2004 | Nam | ............... | H04L 29/12264 370/310 |
| 2006/0215658 A1* | 9/2006 | Uchida | ............ | H04L 29/12264 370/389 |
| 2008/0170566 A1* | 7/2008 | Akimoto | ............ | H04L 61/2015 370/389 |
| 2009/0198800 A1 | 8/2009 | Dighe et al. | | |
| 2013/0166737 A1* | 6/2013 | Christenson | ............ | H04L 69/40 709/224 |
| 2013/0177019 A1* | 7/2013 | Zhang | ................... | H04L 45/586 370/392 |
| 2014/0140244 A1* | 5/2014 | Kapadia | ............... | H04L 61/103 370/255 |

OTHER PUBLICATIONS

Reese, "How does VLAN routing and bridging work when using IRB?," http://www.networkworld.com/article/2344468/cisco-subnet/how-does-vlan-routing-and-bridging-work-when-using-irb-.html, May 31, 2008, 4 pages.

Thomson et al., "IPv6 Stateless Address Autoconfiguration," https://tools.ietf.org/html/rfc4862, Sep. 2007, 30 pages.

Droms, "Dynamic Host Configuration Protocol," https://www.ietf.org/rfc/rfc2131.txt, Mar. 1997, 46 pages.

Cheshire, "IPv4 Address Conflict Detection," https://www.ietf.org/rfc/rfc5227.txt, Jul. 2008, 21 pages.

Extended European Search Report corresponding to EP Application No. 16 17 5936, dated Sep. 7, 2016, 13 pages.

\* cited by examiner

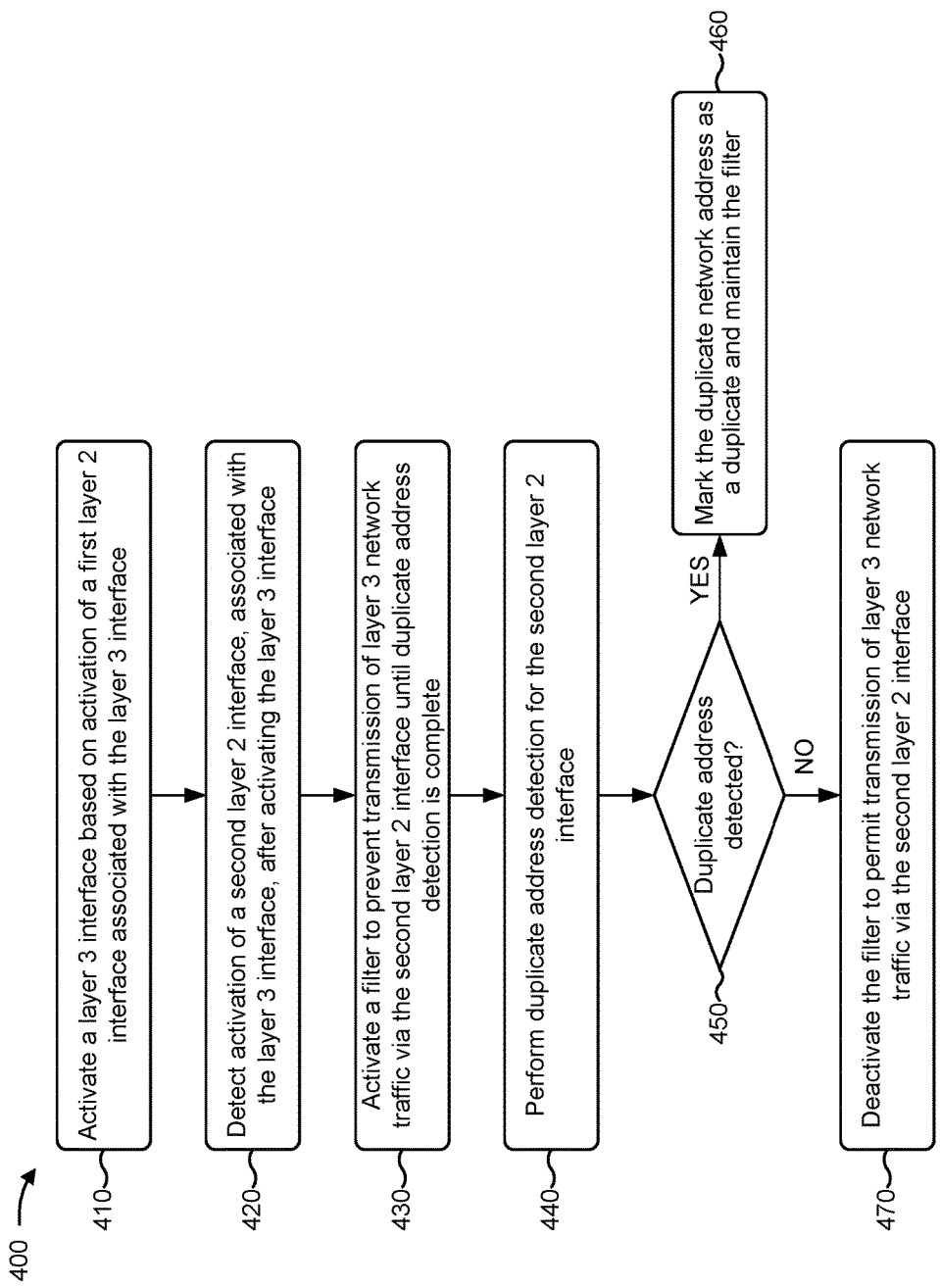

PERFORMING DUPLICATE ADDRESS DETECTION FOR AN INTEGRATED ROUTING AND BRIDGING DEVICE

BACKGROUND

A router, a switch, and a bridge are network devices that transmit data associated with a network. A router may operate at layer 3 of the Open Systems Interconnection (OSI) model (e.g., the network layer), while a switch or a bridge may operate at layer 2 of the OSI model (e.g., the data link layer). In some cases, routing functions (e.g., layer 3 operations) and switching functions (e.g., layer 2 operations) may be incorporated into a single device, such as an integrated routing and bridging (IRB) device.

SUMMARY

According to some possible implementations, a device may include one or more processors to activate a layer 3 interface of the device based on activation of a first layer 2 interface associated with the layer 3 interface. The one or more processors may detect activation of a second layer 2 interface, associated with the layer 3 interface, after activating the layer 3 interface. The one or more processors may activate a filter to prevent transfer of network traffic via the second layer 2 interface based on detecting activation of the second layer 2 interface. The one or more processors may perform duplicate address detection, in association with the second layer 2 interface, for a layer 3 network address assigned to the device. The one or more processors may determine whether the layer 3 network address is a duplicate network address based on performing the duplicate address detection. The one or more processors may selectively maintain or deactivate the filter based on determining whether the layer 3 network address is a duplicate network address.

According to some possible implementations, a non-transitory computer-readable medium may store one or more instructions that, when executed by one or more processors, cause the one or more processors to detect activation of a layer 2 interface of a traffic transfer device after activation of a layer 3 interface of the traffic transfer device. The one or more instructions may cause the one or more processors to activate a filter to prevent transmission of network traffic via the layer 2 interface based on detecting activation of the layer 2 interface. The one or more instructions may cause the one or more processors to perform duplicate address detection, in association with the layer 2 interface, for a first layer 3 network address associated with the traffic transfer device. The one or more instructions may cause the one or more processors to determine whether the first layer 3 network address matches a second layer 3 network address, associated with a device that communicates with the traffic transfer device via the layer 2 interface, based on performing the duplicate address detection. The one or more instructions may cause the one or more processors to selectively maintain or deactivate the filter based on determining whether the first layer 3 network address matches the second layer 3 network address.

According to some possible implementations, a method may include activating, by a network device, a layer 3 interface based on activation of a first layer 2 interface. The method may include detecting, by the network device, activation of a second layer 2 after activating the layer 3 interface. The method may include activating, by the network device, a filter to prevent transfer of network traffic via the second layer 2 interface based on detecting activation of the second layer 2 interface. The method may include performing, by the network device, duplicate address detection, in association with the second layer 2 interface, for a layer 3 network address assigned to the network device. The method may include determining, by the network device, whether the layer 3 network address is a duplicate network address based on performing the duplicate address detection. The method may include selectively maintaining or deactivating, by the network device, the filter based on determining whether the layer 3 network address is a duplicate network address.

BRIEF DESCRIPTION OF THE DRAWINGS

FIG. 4 is a flow chart of an example process for performing duplicate address detection for an integrated routing and bridging device.

DETAILED DESCRIPTION

The following detailed description of example implementations refers to the accompanying drawings. The same reference numbers in different drawings may identify the same or similar elements.

An integrated routing and bridging (IRB) device may refer to a device capable of performing layer 2 bridging (or switching) operations and layer 3 routing operations. For example, an IRB device may include a layer 3 interface configured to route network traffic between networks (e.g., from a first host device on a first network to a second host device on a second network), such as virtual local area networks (VLANs). The IRB device may also include multiple layer 2 interfaces configured to bridge or switch network traffic within a network (e.g., from a first host device on a network to a second host device on the same network), such as a VLAN.

When an initial layer 2 interface of the IRB device is activated, this may trigger activation of a layer 3 interface of the IRB device. Based on activation of the layer 3 interface, the IRB device may perform duplicate address detection to determine whether any host devices, connected to the IRB device via the initial layer 2 interface, use the same network address (e.g., Internet protocol (IP) address) that the IRB device uses for the layer 3 interface. However, when an additional layer 2 interface of the IRB device is activated, this may not trigger activation of the layer 3 interface because the layer 3 interface has already been activated. Thus, the IRB device may not perform duplicate address detection in association with the host devices on the additional layer 2 interface, which may lead to address conflicts between the layer 3 interface of the IRB device and the host devices on the additional layer 2 interface. Implementations described herein assist the IRB device with performing duplicate address detection for multiple layer 2 interfaces, thereby reducing address conflicts and improving network communications.

Figure 1A:
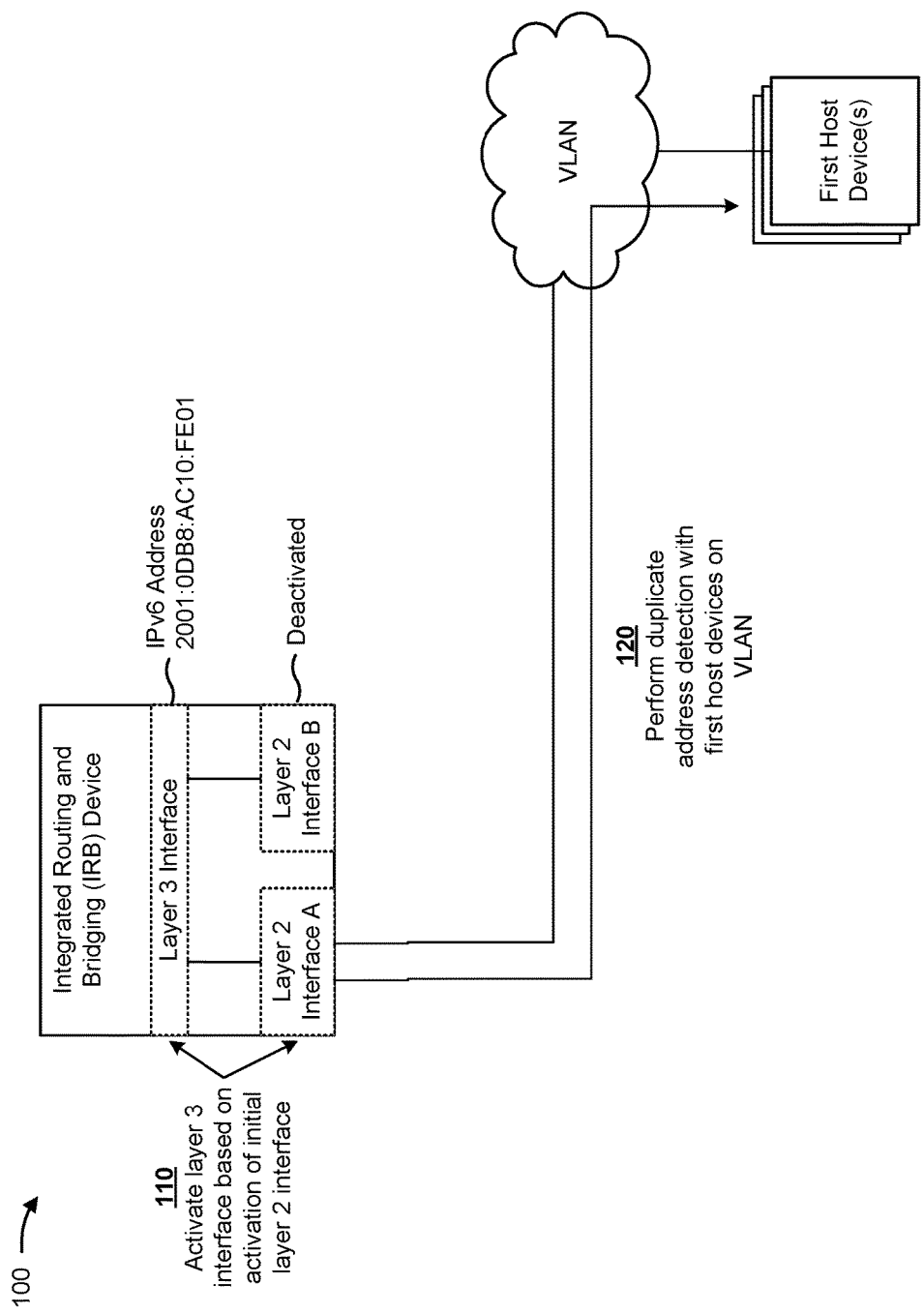
FIGS. 1A-1C are diagrams of an overview of an example implementation described herein.
Figure 1B:
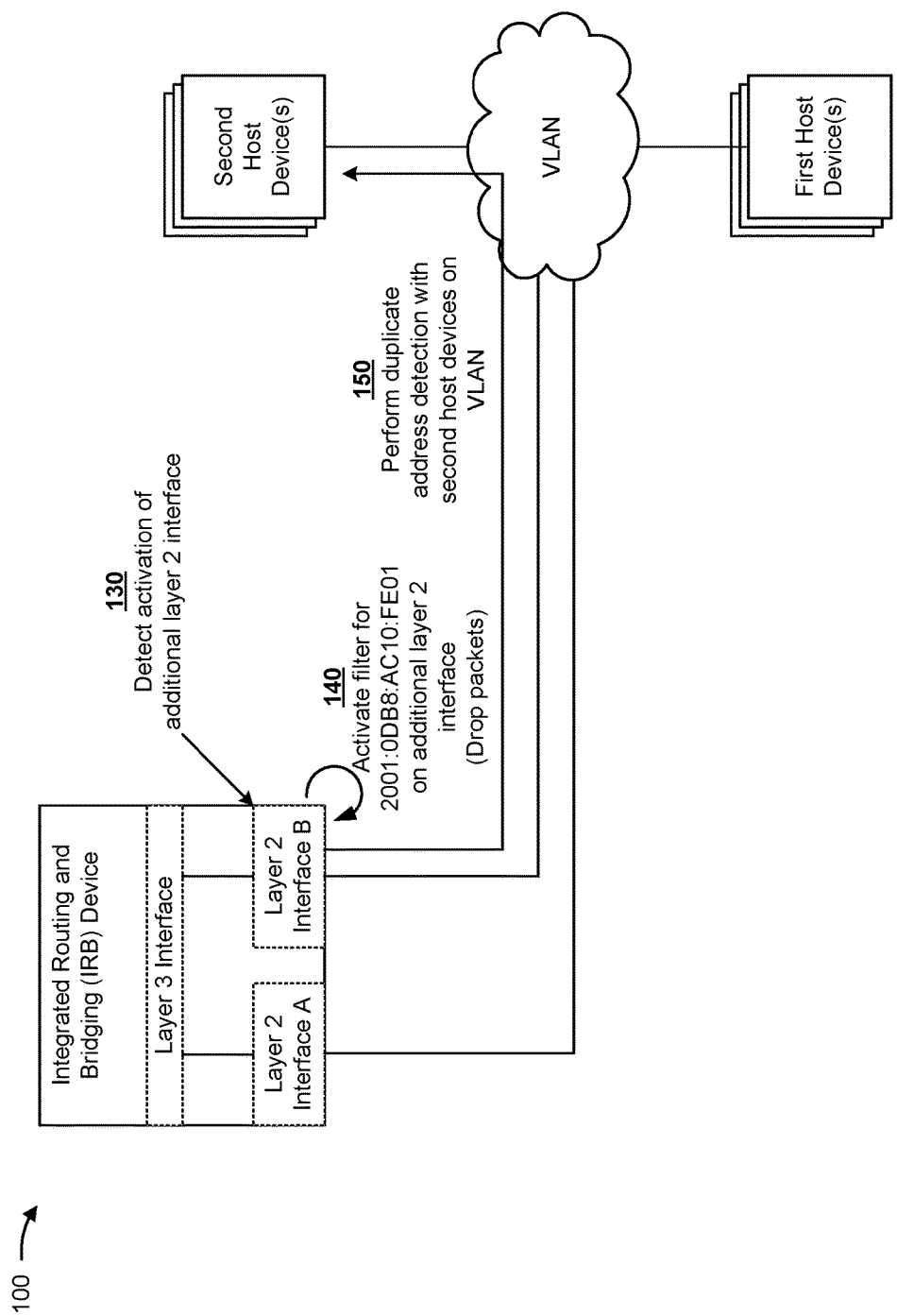
Figure 1C:
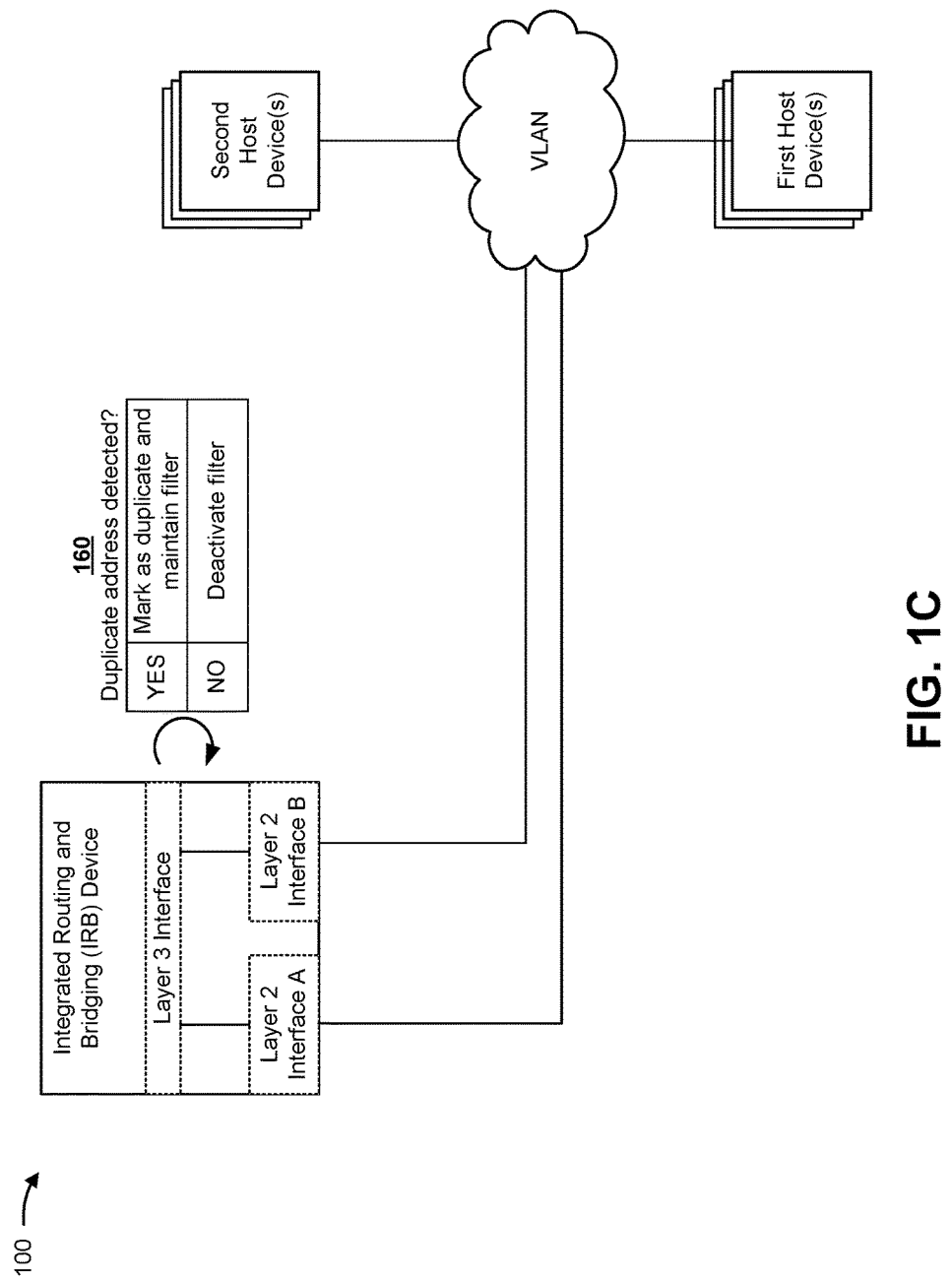

FIGS. 1A-1C are diagrams of an overview of an example implementation 100 described herein. As shown in FIG. 1A, an integrated routing and bridging (IRB) device may include a layer 3 interface and multiple layer 2 interfaces associated with the layer 3 interface. The IRB device may use a layer 2 interface to transfer network traffic between host devices connected to the same network, and may use the layer 3 interface to transfer network traffic between host devices connected to different networks. For example, the IRB device may use a first layer 2 interface, shown as Layer 2 Interface A, to transfer network traffic between a first set of host devices connected to a virtual local area network (VLAN).

As shown by reference number 110, the IRB device may activate the layer 3 interface based on activation of an initial layer 2 interface. For example, the IRB device may activate Layer 2 Interface A when the VLAN is provisioned (e.g., when a first set of host devices of the VLAN are connected to the IRB device via Layer 2 Interface A). Assume that no other layer 2 interfaces are active when Layer 2 Interface A is activated. In this case, activation of Layer 2 Interface A may cause the IRB device to activate the layer 3 interface.

As shown by reference number 120, the IRB device may perform duplicate address detection in association with the first set of host devices of the VLAN. For example, assume that the layer 3 interface is associated with an IP address of 2001:0DB8:AC10:FE01 (e.g., an IPv6 address). In this case, the IRB device may perform duplicate address detection by transmitting messages (e.g., neighbor solicitation messages), to the first set of host devices, that identify the IP address. A host device may determine whether the host device itself is assigned the same IP address (e.g., 2001:0DB8:AC10:FE01), and may send a message to the IRB device indicating whether the IP address is a duplicate address (e.g., is assigned to both the IRB device and a host device). In this case, assume that there are no duplicate addresses among the first set of host devices.

As shown in FIG. 1B, and by reference number 130, the IRB device may detect activation of an additional layer 2 interface after the layer 3 interface has already been activated. For example, the IRB device may activate a second layer 2 interface, shown as Layer 2 Interface B, to transfer network traffic between a second set of host devices connected to the VLAN. As shown by reference number 140, based on detecting activation of Layer 2 Interface B, the IRB device may activate a filter that prevents transmission of network traffic, with a source IP address or a destination IP address of 2001:0DB8:AC10:FE01, via Layer 2 Interface B. This filter may remain active while the IRB device performs duplicate address detection on Layer 2 Interface B to avoid traffic transmission errors in case there is an address conflict. As shown by reference number 150, the IRB device may perform duplicate address detection in association with the second set of host devices of the VLAN while the filter is active.

As shown in FIG. 1C, and by reference number 160, the IRB device may determine whether a duplicate address was detected among the second set of host devices on the VLAN (e.g., whether the IP address of 2001:0DB8:AC10:FE01, used by the layer 3 interface of the IRB device, is also being used by a host device connected to the IRB device via Layer 2 Interface B). If the IRB device determines that the IP address is a duplicate address, then the IRB device may mark this address as a duplicate, and may maintain the filter until the address conflict is resolved. For example, the IRB device may send a message to a user device associated with a network administrator, and the network administrator may provide input to resolve the address conflict. If the IRB device determines that the IP address is not a duplicate address, then the IRB device may deactivate the filter to permit transmission of network traffic, with a source IP address or a destination IP address of 2001:0DB8:AC10:FE01, via Layer 2 Interface B.

In this way, the IRB device may perform duplicate address detection in association with all host devices connected to each layer 2 interface as each layer 2 interface is activated, which increases the likelihood of detecting address conflicts between the layer 3 interface of the IRB device and the host devices connected to the layer 2 interfaces. In this way, the IRB device may reduce traffic transfer errors and improve network communications.

As indicated above, FIGS. 1A-1C are provided merely as an example. Other examples are possible and may differ from what was described with regard to FIGS. 1A-1C.

Figure 2:
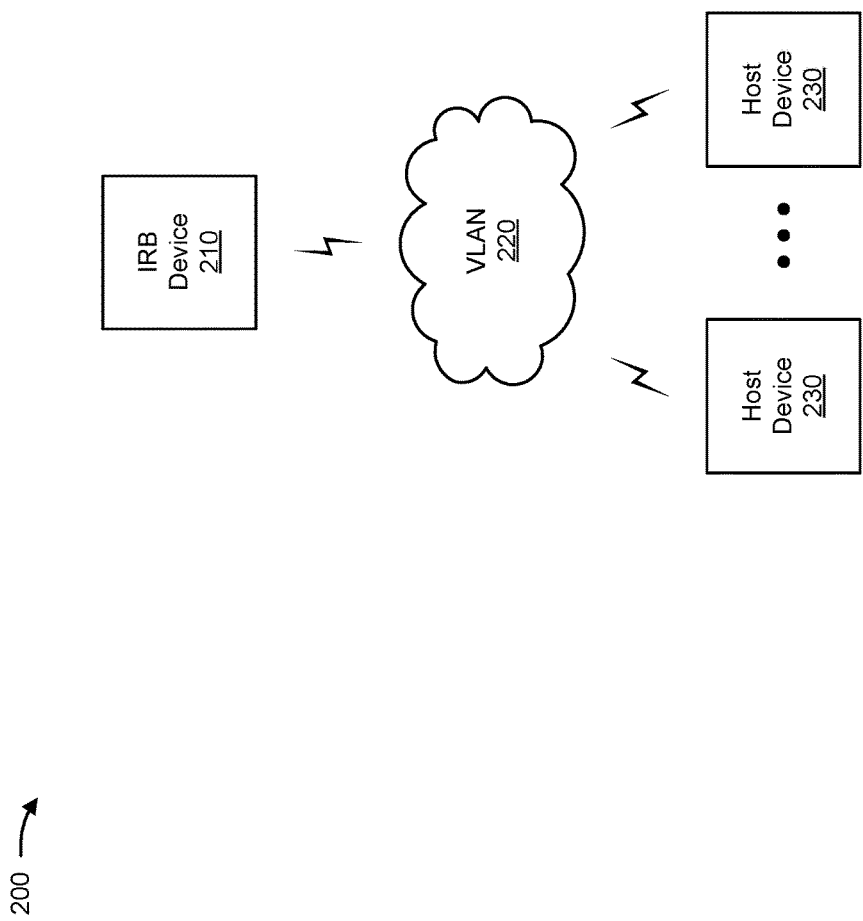
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an integrated routing and bridging (IRB) device 210, a virtual local area networks (VLAN) 220, and a set of host devices 230. Devices of environment 200 may interconnect via wired connections, wireless connections, or a combination of wired and wireless connections.

IRB device 210 includes a traffic transfer device capable of performing layer 3 routing operations and layer 2 switching and/or bridging operations. For example, IRB device 210 may include a network device, such as a switch, a bridge, a router, a gateway, a firewall, a hub, a reverse proxy, a server (e.g., a proxy server, a server executing a virtual machine, etc.), a security device, an intrusion detection device, a load balancer, a line card (e.g., in a chassis-based system), or a similar type of device. IRB device 210 may perform layer 2 traffic transfer operations (e.g., bridging or switching) for host devices 230 connected to a same VLAN 220, and may perform layer 3 traffic transfer operations (e.g., routing) for host devices 230 connected to different VLANs 220.

In some implementations, IRB device 210 may perform the layer 2 traffic transfer operations using layer 2 network addresses, such as media access control (MAC) addresses, and may perform the layer 3 traffic transfer operations using layer 3 network addresses, such as IP addresses (e.g., IPv6 addresses). Additionally, or alternatively, IRB device 210 may include a layer 3 interface to perform the layer 3 operations for inter-VLAN network traffic, and may include multiple layer 2 interfaces to perform the layer 2 operations for intra-VLAN network traffic. In some implementations, multiple layer 2 interfaces may be associated with the same VLAN 220, such that each layer 2 interface transfers network traffic among a different set of host devices 230 of VLAN 220. A layer 3 interface may be associated with multiple layer 2 interfaces and/or multiple VLANs 220, such that the layer 3 interface transfers network traffic among multiple VLANs 220.

When IRB device 210 receives network traffic from a source host device 230, IRB device 210 may determine whether a destination host device 230 is located on the same VLAN 220 as the source host device 230 or a different VLAN 220 from the source host device 230 (e.g., based on a network address of the source host device 230 and/or the destination host device 230, such as a MAC address). Additionally, or alternatively, IRB device 210 may determine whether the source host device 230 and the destination host device 230 are connected via the same layer 2 interface of IRB device 210. If IRB device 210 determines that the source host device 230 and the destination host device 230 are located on the same VLAN 220 and/or are connected via the same layer 2 interface, then IRB device 210 may use a layer 2 interface, that connects the host devices 230, to transfer the network traffic between the host devices 230. If IRB device 210 determines that the source host device 230 and the destination host device 230 are located on different VLANs 220, then IRB device 210 may use a layer 3 interface (and, in some cases, layer 2 interfaces associated with the different VLANs 220) to transfer the network traffic between the host devices 230.

VLAN 220 includes one or more wired and/or wireless networks. In some implementations, VLAN 220 may include a virtual local area network. Additionally, or alternatively, VLAN 220 may include another type of local area network (LAN). One or more VLANs 220 may be served by IRB device 210 (e.g., IRB device 210 may be used to transfer traffic within or among VLAN(s) 220).

Host device 230 includes one or more devices connected to VLAN 220. For example, host device 230 may include a computing device, such as a desktop computer, a laptop computer, tablet computer, a server device, a telephone (e.g., a wireless telephone or a wired telephone), a printer, a copier, a scanner, a fax machine, or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
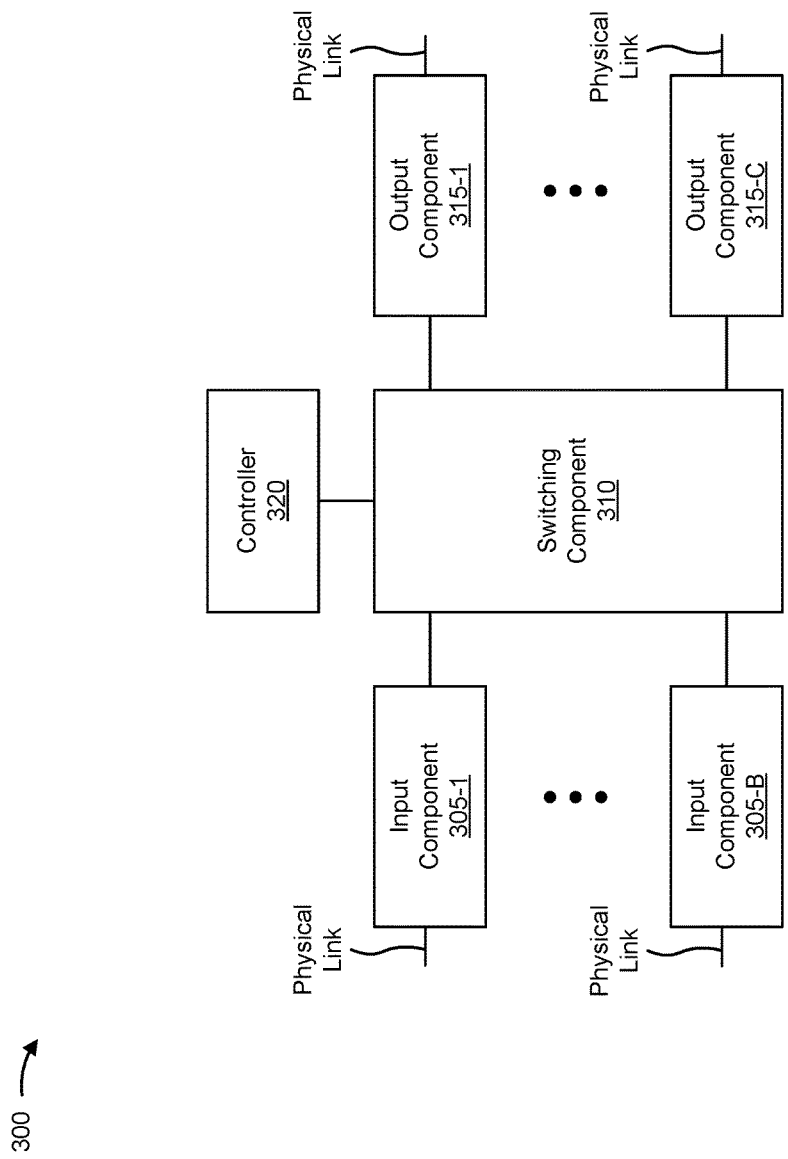
FIG. 3 is a diagram of example components of one or more devices of FIG. 2.

FIG. 3 is a diagram of example components of a device 300. Device 300 may correspond to IRB device 210. In some implementations, IRB device 210 may include one or more devices 300 and/or one or more components of device 300. As shown in FIG. 3, device 300 may include a set of input components 305-1 through 305-B (B≥1) (referred to individually as "input component 305," and collectively as "input components 305"), a switching component 310, a set of output components 315-1 through 315-C (C≥1) (referred to individually as "output component 315," and collectively as "output components 315"), and a controller 320. Components of device 300 may interconnect via wired connections, wireless connections, or a combination of wired and wireless connections.

Input component 305 includes a point of attachment for a physical link connected to device 300, and is a point of entry for incoming traffic (e.g., packets) received by device 300. Input component 305 processes incoming traffic, such as by performing data link layer encapsulation or decapsulation. In some implementations, input component 305 sends and/or receives packets. In some implementations, input component 305 includes an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 is implemented via one or more crossbars, via one or more busses, and/or using shared memory. The shared memory may act as a temporary buffer to store packets from input components 305 before the packets are eventually scheduled for delivery to output components 315. In some implementations, switching component 310 enables input components 305, output components 315, and/or controller 320 to communicate.

Output component 315 includes a point of attachment for a physical link connected to device 300, and is a point of exit for outgoing traffic (e.g., packets) transmitted by device 300. Output component 315 stores packets and/or may schedule packets for transmission on output physical links. Output component 315 supports data link layer encapsulation or decapsulation, and/or a variety of higher-level protocols. In some implementations, output component 315 sends packets and/or receives packets. In some implementations, output component 315 includes an output line card that includes one or more packet processing components (e.g., in the form of integrated circuits), such as one or more IFCs, packet forwarding components, line card controller components, output ports, processors, memories, and/or output queues. In some implementations, input component 305 and output component 315 are implemented by the same set of components (i.e., an input/output component are a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 includes one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 performs these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing duplicate address detection for an integrated routing and bridging device. In some implementations, one or more process blocks of FIG. 4 may be performed by IRB device 210. In some implementations, one or more process blocks of FIG. 4 may be performed by another device or a group of devices separate from or including IRB device 210, such as host device 230.

As shown in FIG. 4, process 400 may include activating a layer 3 interface based on activation of a first layer 2 interface associated with the layer 3 interface (block 410). For example, IRB device 210 may include a layer 3 interface and multiple layer 2 interfaces associated with the layer 3 interface. IRB device 210 may use a layer 2 interface to transfer network traffic between host devices 230 connected to the same VLAN 220 (e.g., connected via the layer 2 interface), and may use the layer 3 interface to transfer network traffic between host devices 230 connected to different VLANs 220.

IRB device 210 may activate (e.g., configure for use, provision, make available, etc.) a layer 3 interface when one of the layer 2 interfaces, associated with the layer 3 interface, is activated (e.g., is configured for use, is provisioned, is made available, becomes connected to and/or begins communicating with a host device 230, etc.). For example, when an initial layer 2 interface is activated (e.g., when no other layer 2 interfaces are active), IRB device 210 may activate the layer 3 interface.

Based on activation of the layer 3 interface, IRB device 210 may perform duplicate address detection to ensure that a network address (e.g., an IP address, such as an IPv6 address or an IPv4 address) that identifies IRB device 210 (e.g., the layer 3 interface of IRB device 210) is not being used by any host devices 230 connected to the initial layer 2 interface that triggered activation of the layer 3 interface. Implementations described below may be used by IRB device 210 to perform additional duplicate address detection for additional layer 2 interfaces that are activated after the layer 3 interface has already been activated. Thus, IRB device 210 may avoid address conflicts that may otherwise occur if activation of additional layer 2 interfaces does not trigger activation of the layer 3 interface (e.g., because the layer 3 interface has already been activated).

As further shown in FIG. 4, process 400 may include detecting activation of a second layer 2 interface, associated with the layer 3 interface, after activating the layer 3 interface (block 420), activating a filter to prevent transmission of layer 3 network traffic via the second layer 2 interface until duplicate address detection is complete (block 430), and performing duplicate address detection for the second layer 2 interface (block 440). For example, IRB device 210 may detect activation of a second layer 2 interface after the first (initial) layer 2 interface and the layer 3 interface have been activated. Based on detecting activation of the second layer 2 interface, IRB device 210 may activate a filter to prevent transfer (e.g., transmission) of layer 3 network traffic via the second layer 2 interface until duplicate address detection is completed for the second layer 2 interface, and may perform duplicate address detection for the second layer 2 interface.

In some implementations, IRB device 210 may activate the filter to prevent transmission of layer 3 network traffic that includes a layer 3 network address of IRB device 210 (e.g., an IP address, such as an IPv6 address, used by the layer 3 interface of IRB device 210). For example, IRB device 210 may prevent transmission of network traffic that includes the layer 3 network address of IRB device 210 as a source address or a destination address of the network traffic. In this way, IRB device 210 may permit some network traffic to be transmitted while duplicate address detection is performed, thereby more efficiently using network resources by avoiding retransmissions.

As another example, IRB device 210 may prevent transmission of all layer 3 network traffic via the second layer 2 interface. In this way, IRB device 210 may conserve computing resources (e.g., processor and/or memory resources) by avoiding transmissions while duplicate address detection is performed. As another example, IRB device 210 may prevent transmission of all network traffic (e.g., layer 2 network traffic and layer 3 network traffic) via the second layer 2 interface. In this way, IRB device 210 may conserve computing resources (e.g., processor and/or memory resources) by avoiding transmissions while duplicate address detection is performed. In some implementations, IRB device 210 may prevent transmission of the network traffic by dropping the network traffic. For example, the filter may include a rule, such as a rule that indicates that the network traffic is to be dropped if the source address or the destination address matches the layer 3 network address of IRB device 210, or a rule that indicates that the network traffic is to be buffered (e.g., for a threshold amount of time or until duplicate address detection is complete).

Additionally, or alternatively, IRB device 210 may prevent the transmission of network traffic, that includes the layer 3 network address of IRB device 210, via the second layer 2 interface. For example, IRB device 210 may have already performed duplicate address detection for the first layer 2 interface. Thus, IRB device 210 may transmit layer 3 network traffic received via and/or to be transmitted via the first layer 2 interface (e.g., assuming duplicate address detection for the first layer 2 interface indicated no address conflict). However, IRB device 210 may prevent transmission of layer 3 network traffic received via and/or to be transmitted via the second layer 2 interface until duplicate address detection for the second layer 2 interface is complete. In some implementations, IRB device 210 may continue to transfer layer 2 network traffic (e.g., intra-VLAN traffic) via the second layer 2 interface while preventing transmission of the layer 3 network traffic (e.g., inter-VLAN traffic) via the second layer 2 interface.

In some implementations, IRB device 210 may perform duplicate address detection by transmitting one or more duplicate address detection messages via the second layer 2 interface. In some implementations, a duplicate address detection message may include a neighbor solicitation message (e.g., a DupAddrDetectTransmits Neighbor Solicitation message). Additionally, or alternatively, the duplicate address detection message(s) may include point-to-multipoint message(s), such as multicast message(s) or broadcast message(s). In this way, IRB device 210 may transmit the duplicate address detection message(s) to every host device 230 connected to IRB device 210 via the second layer 2 interface, thereby ensuring full coverage for duplicate address detection.

As further shown in FIG. 4, process 400 may include determining whether a duplicate address has been detected (block 450). In some implementations, when duplicate address detection for the second layer 2 interface is complete (e.g., after a threshold amount of time has passed since transmitting a duplicate address detection message), IRB device 210 may determine whether a duplicate address has been detected on the second layer 2 interface. For example, IRB device 210 may determine whether a host device 230, connected to the second layer 2 interface, has a duplicate address (e.g., a same layer 3 network address) as IRB device 210. In other words, IRB device 210 may determine whether a first layer 3 network address, assigned to IRB device 210, is the same as a second layer 3 network address assigned to host device 230 in communication with IRB device 210 via the second layer 2 interface. In some implementations, IRB device 210 may make this determination based on one or more messages received from host devices 230 connected to (e.g., in communication with) IRB device 210 via the second layer 2 interface.

For example, a duplicate address detection message, transmitted by IRB device 210, may indicate the layer 3 network address of IRB device 210. When host device 230 receives the duplicate address detection message, host device 230 may identify the layer 3 network address included in the duplicate address detection message, and may determine whether host device 230 has been assigned the same layer 3 network address. Host device 230 may transmit, to IRB device 210, a message that indicates whether host device 230 is associated with the same layer 3 network address as the layer 3 network address identified in the duplicate address detection message.

As further shown in FIG. 4, if a duplicate address has been detected (block 450—YES), then process 400 may include marking the duplicate network address as a duplicate and maintaining the filter (block 460). For example, if IRB device 210 determines that duplicate address detection has failed (e.g., if IRB device 210 receives an indication of a duplicate address), then IRB device 210 may maintain the filter. IRB device 210 may maintain the filter to prevent traffic transmission errors as a result of the duplicate address. When maintaining the filter, IRB device 210 may continue to prevent transmission of network traffic (e.g., that includes the layer 3 network address) via the second layer 2 interface.

Additionally, or alternatively, IRB device 210 may mark the network address as a duplicate address. For example, IRB device 210 may store an indication that the network address is a duplicate address. Additionally, or alternatively, IRB device 210 may transmit a notification message to a user device associated with a network administrator. The notification message may include information that identifies the duplicate network address, information that identifies IRB device 210 associated with the duplicate network address, information that identifies the layer 3 interface associated with the duplicate network address, information that identifies the layer 2 interface associated with the duplicate network address, information that identifies VLAN 220 associated with the duplicate network address, and/or information that identifies host device 230 associated with the duplicate network address. In this way, a network administrator may provide input to resolve the address conflict. For example, the network administrator may provide input to assign a different layer 3 network address to IRB device 210 and/or host device 230.

In some implementations, IRB device 210 may determine whether the layer 3 network address has been derived from a layer 2 network address. For example, an IPv6 address may be derived from a MAC address when the IPv6 address is in a particular format, such as a format that includes a 64-bit extended unique identifier (EUI-64), where a portion of the IPv6 address is derived from the MAC address. When IRB device 210 determines that the layer 3 network address (e.g., of IRB device 210 and/or host device 230 with the duplicate layer 3 network address) has been derived from a layer 2 network address (e.g., of IRB device 210 and/or host device 230), then IRB device 210 may deactivate the second layer 2 interface. For example, when IRB device 210 detects a duplicate layer 3 network address that has been derived from a layer 2 network address, this may indicate that the layer 2 network address is also a duplicate address. Thus, in this case, IRB device 210 may deactivate the layer 2 interface to prevent layer 2 network address conflicts, thereby reducing network errors and improving network communications.

As further shown in FIG. 4, if a duplicate address has not been detected (block 450—NO), then process 400 may include deactivating the filter to permit transmission of layer 3 network traffic via the second layer 2 interface (block 470). For example, if IRB device 210 determines that duplicate address detection has succeeded (e.g., if IRB device 210 does not receive any indication of a duplicate address), then IRB device 210 may deactivate the filter. IRB device 210 may deactivate the filter to permit transmission of network traffic (e.g., that includes the layer 3 network address) via the second layer 2 interface. In this way, IRB device 210 may permit transmission of layer 3 network traffic after determining that there will not be any address conflicts associated with the layer 3 network traffic.

While implementations are described above in connection with a first layer 2 interface and a second layer 2 interface, IRB device 210 may perform process 400 (e.g., blocks 420-470) for each newly activated layer 2 interface (e.g., a third layer 2 interface, a fourth layer 2 interface, a fifth layer 2 interface, etc.). In this way, IRB device 210 may perform duplicate address detection in association with each newly activated layer 2 interface, associated with a layer 3 interface, after an initial layer 2 interface triggers activation of the layer 3 interface. In this way, IRB device 210 may increase the likelihood that duplicate addresses are detected, thereby reducing network errors and increasing network performance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein assist an IRB device with performing duplicate address detection for multiple layer 2 interfaces associated with a layer 3 interface, thereby reducing address conflicts and improving network communications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, network traffic or traffic may refer to information communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      detect activation of a first layer 2 interface of the device used to communicate with a first set of host devices;
      activate a layer 3 interface of the device based on activation of the first layer 2 interface associated with the layer 3 interface,
         the layer 3 interface being associated with a layer 3 network address, and
         a second layer 2 interface, associated with the layer 3 interface, being inactive while the layer 3 interface is active;
      detect activation of the second layer 2 interface, associated with the layer 3 interface, while the layer 3 interface is active,
         the second layer 2 interface being used to communicate with a second set of host devices;
      activate a filter to prevent transfer of network traffic via the second layer 2 interface based on detecting activation of the second layer 2 interface;
      perform duplicate address detection, in association with the second layer 2 interface and the second set of host devices, for the layer 3 network address;
      determine whether the layer 3 network address is a duplicate network address from among network addresses of the second set of host devices based on performing the duplicate address detection; and
      selectively maintain or deactivate the filter based on determining whether the layer 3 network address is a duplicate network address,
         the one or more processors, when selectively maintaining or deactivating the filter, are to:
            maintain the filter when the layer 3 network address is a duplicate network address; or
            deactivate the filter when the layer 3 network address is not a duplicate network address.

2. The device of claim 1, where the one or more processors, when determining whether the layer 3 network address is a duplicate network address, are to:
   determine whether the layer 3 network address is a same network address as another layer 3 network address of a set of layer 3 network addresses assigned to the second set of host devices in communication with the device via the second layer 2 interface.

3. The device of claim 1, where the layer 3 network address is an Internet protocol (IP) address.

4. The device of claim 1, where the filter prevents transfer of all network traffic via the second layer 2 interface.

5. The device of claim 1, where the filter prevents transfer of network traffic, that includes the layer 3 network address, via the second layer 2 interface.

6. The device of claim 1, where the one or more processors, when determining whether the layer 3 network address is a duplicate network address, are to:
   determine that the layer 3 network address is a duplicate network address; and
   where the one or more processors are further to:
      deactivate the second layer 2 interface based on determining that the layer 3 network address is a duplicate network address.

7. The device of claim 6, where the one or more processors are further to:
   determine that the layer 3 network address has been derived from a layer 2 network address; and
   where the one or more processors, when deactivating the second layer 2 interface, are to:
      deactivate the second layer 2 interface based on determining that the layer 3 network address has been derived from the layer 2 network address.

8. A non-transitory computer-readable medium storing instructions, the instructions comprising:
   one or more instructions that, when executed by one or more processors, cause the one or more processors to:
      detect activation of a first layer 2 interface of a traffic transfer device used to communicate with a first set of host devices;
      activate a layer 3 interface of the traffic transfer device based on activation of the first layer 2 interface,
         the layer 3 interface being associated with a first layer 3 network address, and
         a second layer 2 interface, associated with the layer 3 interface, being inactive while the layer 3 interface is active;
      detect activation of the second layer 2 interface, associated with the layer 3 interface, while the layer 3 interface is active,
         the second layer 2 interface being used to communicate with a second set of host devices;
      activate a filter to prevent transmission of network traffic via the second layer 2 interface based on detecting activation of the second layer 2 interface;
      perform duplicate address detection, in association with the second layer 2 interface and the second set of host devices, for the first layer 3 network address;

determine whether the first layer 3 network address matches a second layer 3 network address from among network addresses of the second set of host devices based on performing the duplicate address detection; and selectively maintain or deactivate the filter based on determining whether the first layer 3 network address matches the second layer 3 network address, the one or more processors, when selectively maintaining or deactivating the filter, to:

maintain the filter when the first layer 3 network address matches the second layer 3 network address; or deactivate the filter when the first layer 3 network address does not match the second layer 3 network address.

9. The non-transitory computer-readable medium of claim 8, where the one or more instructions, that cause the one or more processors to determine whether the first layer 3 network address matches the second layer 3 network address, cause the one or more processors to:

determine that the first layer 3 network address matches the second layer 3 network address; and where the one or more instructions, when executed by the one or more processors, further cause the one or more processors to:

transmit a notification message, indicating that the first layer 3 network address is a duplicate address, based on determining that the first layer 3 network address matches the second layer 3 network address.

10. The non-transitory computer-readable medium of claim 8, where the one or more instructions, that cause the one or more processors to determine whether the first layer 3 network address matches the second layer 3 network address, cause the one or more processors to:

determine that the first layer 3 network address matches the second layer 3 network address; and where the one or more instructions, when executed by the one or more processors, further cause the one or more processors to:

store an indication that the first layer 3 network address is a duplicate address based on determining that the first layer 3 network address matches the second layer 3 network address.

11. The non-transitory computer-readable medium of claim 8, where the one or more instructions, that cause the one or more processors to determine whether the first layer 3 network address matches the second layer 3 network address, cause the one or more processors to:

determine that the first layer 3 network address matches the second layer 3 network address; and where the one or more instructions, when executed by the one or more processors, further cause the one or more processors to:

determine that the first layer 3 network address has been derived from a layer 2 network address associated with the traffic transfer device; and deactivate the second layer 2 interface based on determining that the first layer 3 network address has been derived from the layer 2 network address.

12. The non-transitory computer-readable medium of claim 11, where the one or more instructions, that cause the one or more processors to determine that the first layer 3 network address has been derived from the layer 2 network address, cause the one or more processors to:

determine that a portion of the first layer 3 network address includes a 64-bit extended unique identifier derived from the layer 2 network address.

13. The non-transitory computer-readable medium of claim 8, where the first layer 3 network address is an Internet protocol (IP) version 6 (IPv6) address.

14. The non-transitory computer-readable medium of claim 8, where the first layer 3 network address is an Internet protocol (IP) version 4 (IPv4) address.

15. A method, comprising:

detecting, by a network device, activation of a first layer 2 interface used to communicate with a first set of host devices;

activating, by the network device, a layer 3 interface based on activation of the first layer 2 interface, the layer 3 interface being associated with a layer 3 network address, and a second layer 2 interface, associated with the layer 3 interface, being inactive while the layer 3 interface is active;

detecting, by the network device, activation of the second layer 2 interface while the layer 3 interface is active, the second layer 2 interface being used to communicate with a second set of host devices;

activating, by the network device, a filter to prevent transfer of network traffic via the second layer 2 interface based on detecting activation of the second layer 2 interface;

performing, by the network device, duplicate address detection, in association with the second layer 2 interface and the second set of host devices, for the layer 3 network address;

determining, by the network device, whether the layer 3 network address is a duplicate network address from among network addresses of the second set of host devices based on performing the duplicate address detection; and selectively maintaining or deactivating, by the network device, the filter based on determining whether the layer 3 network address is a duplicate network address, the network device, when selectively maintaining or deactivating the filter, is to:

maintain the filter when the layer 3 network address is a duplicate network address; or deactivate the filter when the layer 3 network address is not a duplicate network address.

16. The method of claim 15, further comprising:

permitting transfer of network traffic via the first layer 2 interface while preventing transfer of network traffic via the second layer 2 interface.

17. The method of claim 15, further comprising:

permitting transfer of layer 2 network traffic via the second layer 2 interface while preventing transfer of layer 3 network traffic via the second layer 2 interface.

18. The method of claim 15, where the filter prevents transfer of layer 3 network traffic via the second layer 2 interface.

19. The method of claim 15, where the filter prevents transfer of layer 2 network traffic via the second layer 2 interface.

20. The method of claim 15, where the first layer 2 interface and the second layer 2 interface are associated with a same virtual local area network (VLAN) served by the network device.

* * * * *